United States Patent [19]
Wakabayashi

[11] 3,818,785
[45] June 25, 1974

[54] BOTTLING SYSTEM

[75] Inventor: Shigeru Wakabayashi, Tokushima, Japan

[73] Assignee: Shikoku Kakooki Co., Ltd., Tokushima, Japan

[22] Filed: Mar. 27, 1972

[21] Appl. No.: 238,289

[30] Foreign Application Priority Data
Aug. 27, 1971  Japan.............................. 46-18074

[52] U.S. Cl......................... 82/101, 82/102, 82/48, 53/29
[51] Int. Cl............................................ B23b 5/14
[58] Field of Search............. 82/48, 101, 102, 52, 53, 82/59; 53/381 R, 381 A, 183, 186

[56] References Cited
UNITED STATES PATENTS
| | | | |
|---|---|---|---|
| 2,298,366 | 10/1942 | Gladfelter et al................. | 82/102 X |
| 2,940,229 | 6/1960 | Baker........................... | 52/381 A X |
| 3,084,578 | 4/1963 | Hartford........................ | 82/101 X |
| 3,563,000 | 2/1971 | Whitehouse et al.............. | 53/183 X |
| 3,653,285 | 4/1972 | Yoshikawa et al................ | 82/48 X |
| 3,659,486 | 5/1972 | Criss et al..................... | 82/48 X |

*Primary Examiner*—Leonidas Vlachos
*Assistant Examiner*—Horace M. Culver
*Attorney, Agent, or Firm*—George B. Oujevolk

[57] ABSTRACT

A trimming turret for removing useless heads from moulded bottles. Bottles with useless heads are continuously conveyed in line by a conveyor into the turret and engaged at the entrance of the turret by starwheel transfer means which place the bottles into a turntable having a plurality of bottle receiving means disposed around the turntable. The bottles are then acted on by a bottle gripping member and bottle rotating means disposed over said bottle receiving means. The useless head is cut off by a cutting blade in the gripping means. The finished bottle is then removed from the bottle receiving means in the turntable by second star wheel transfer means to be then transported to the next work station.

1 Claim, 10 Drawing Figures

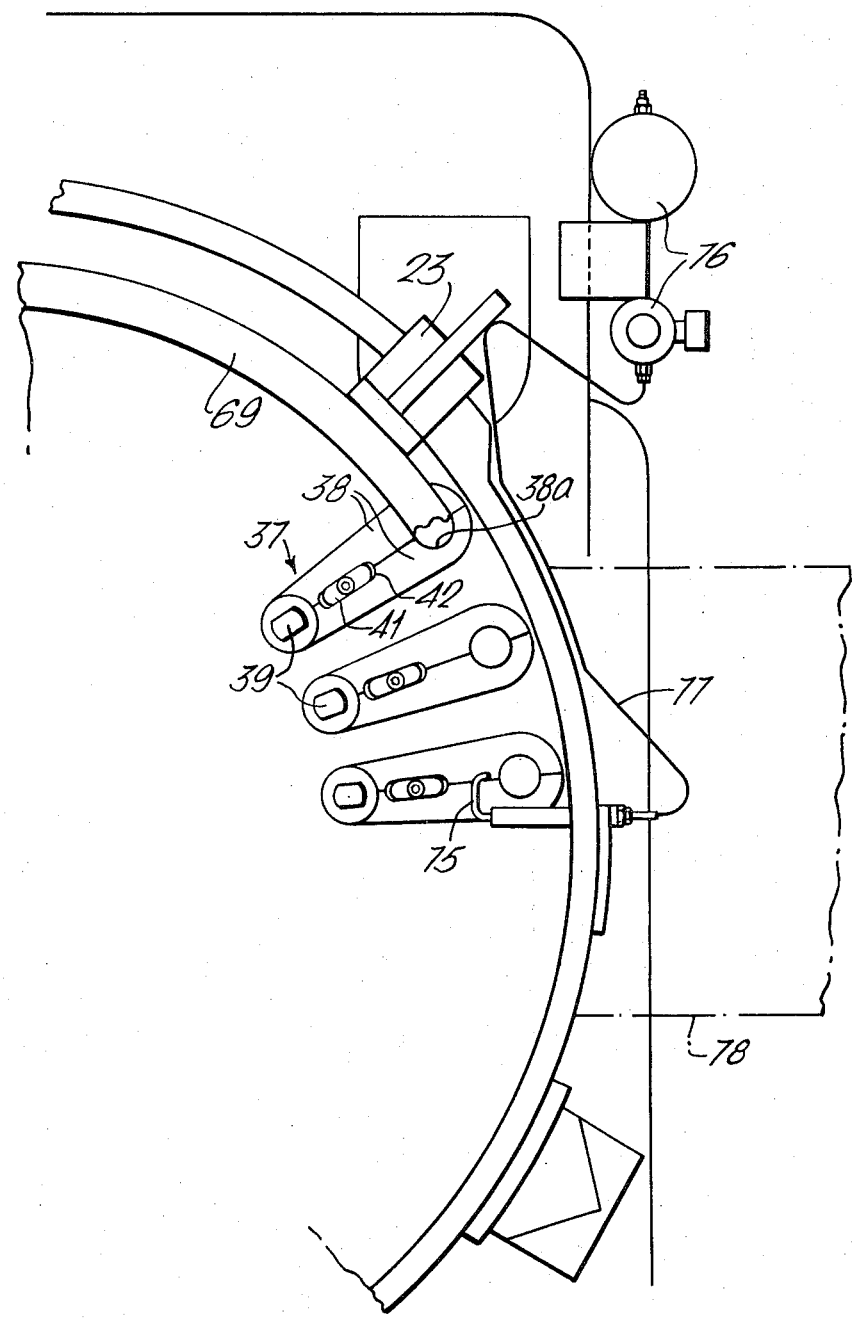

BOTTLING SYSTEM

BACKGROUND OF THE INVENTION

The present invention relates to bottle finishing apparatus for removing waste material from a moulded bottle and to a process incorporating such an apparatus for manufacturing bottled products by filling synthetic resin bottles particularly with milk or an acid-ophilus beverage.

BRIEF REVIEW OF THE PRIOR ART

In recent years, synthetic resin (plastics material) bottles which are very inexpensive to manufacture in a large quantity, have been extensively used for bottling milk, acidophilus beverage or the like. In preparing such bottled products, it has been the conventional practice to produce bottles in the form of a finished product by means of an injection moulding machine and to continuously supply the bottles to a bottle filling process. However, in the case where bottles with a somewhat increased capacity are required, it is difficult, from the viewpoint of blow-moulding techniques, to employ the moulding operation such as has been used for the manufacture of the bottles in the form of the finished products. Accordingly, there arises a need to produce bottles with a useless or discardable head by a moulding machine and to subsequently fill the bottles after cutting-off the useless head. However, since conventional bottling processes do not include means for removing useless heads, it is impossible to carry out a continuous operation for the entire process from the moulding of the bottles with a useless head up to the filling of the bottles.

According to the present invention there is provided a bottle finishing apparatus for removing useless heads from moulded bottles comprising one or more bottle receiving means, one or more gripping devices each operable to hold a bottle rotatable therein and having an associated head-severing means, and means for effecting relative rotation between a bottle located in one of said gripping devices and said head-severing means.

Preferably the bottle receiving means, gripping devices and bottle rotation means are mounted on one or more rotary means, and activating means are provided to cause each of said receiving means to deliver a bottle to a gripping device which operates to hold said bottle rotatable therein, and a rotating device operates to rotate said bottle in said gripping device whilst the severing device acts against the useless head to sever such from the bottle.

SUMMARY OF THE INVENTION

The process for manufacturing bottled products contemplated herein is characterized by blow-moulding synthetic resin bottles with an integral useless head by means of a moulding machine, sending the bottles into a storage tank for a temporary storage, transferring the bottles from the storage tank to a bottle aligning machine continuously at a constant rate, and feeding the aligned bottles in the upright position to a bottling machine one after another, the bottles being led to a finishing machine to have the useless head thereof removed during the foregoing process as they are being transported in an upright position subsequent to production by the moulding machine or on the aligning machine; the bottles being sealed after being filled by the bottling machine.

The invention will be described further, by way of example, with reference to the accompanying drawings, in which:

BRIEF DESCRIPTION OF THE DRAWINGS

FIG. 8 is a plan view of a mechanism for removing a useless head.

DETAILED DESCRIPTION

Figure 1:
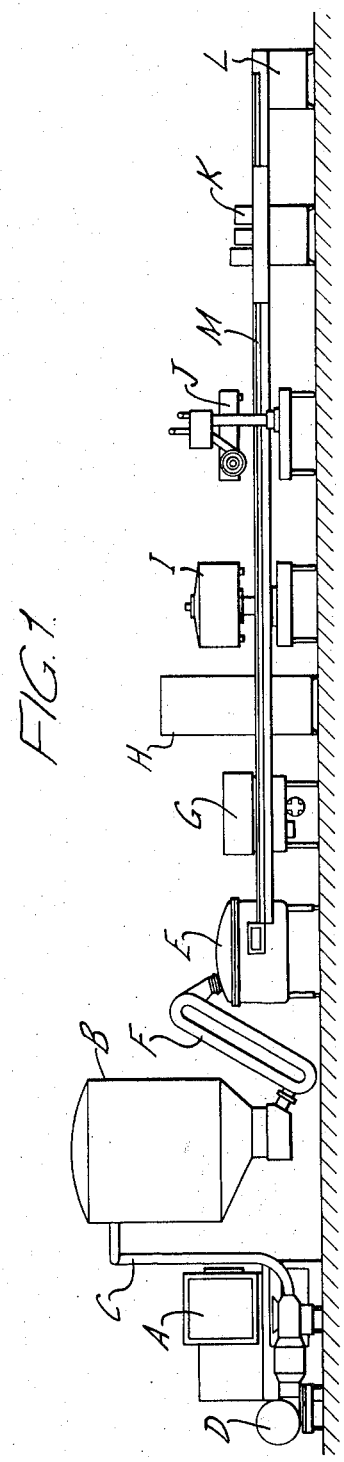
FIG. 1 is a schematic side elevation showing a combination of machines for carrying out a bottling process and incorporating the bottle finishing apparatus according to the invention.

FIG. 1 shows a bottling system including a blow moulding machine A, a storage tank B, an air chute C for transferring bottles formed by the moulding machine A to the storage tank B, a blower D therefore, a bottle aligning machine E, a completely sealed bucket conveyor F for sending the bottles discharged from the storage tank B to the aligning machine, a finishing machine G for cutting the useless heads off the bottles for removal, a control panel H for controlling the amount of bottles to be subsequently fed to a bottling machine I, a capping and sealing machine J, a labelling machine K, a bottle collecting table L, and a conveyor M extending from the bottle aligning machine E to the bottle collecting table L.

Figure 9:
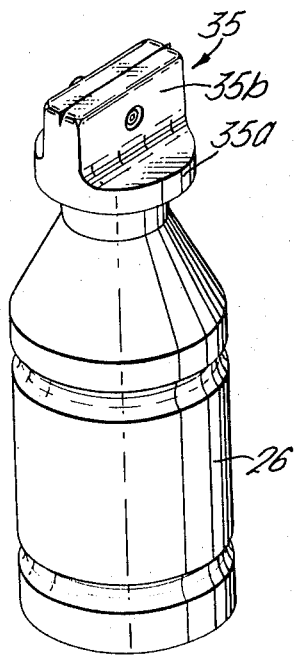
FIG. 9 is a perspective view of a bottle with useless head as it has been moulded by the moulding machine.
Figure 10:
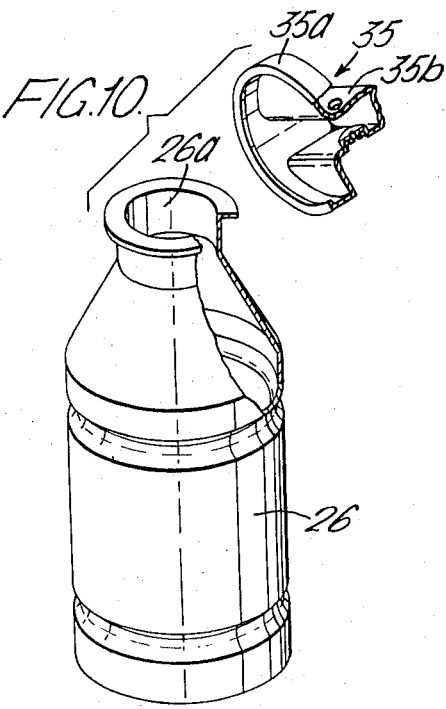
FIG. 10 is a perspective view showing a bottle and useless head cut-off and separated therefrom.

The series of apparatuses from the moulding machine A to the labelling machine K thus arranged are all adapted to be driven in synchronism. Bottles 26, each having an integral useless head 35 as shown in FIG. 9, are first blow-moulded by the moulding machine A and the bottles are then led into the storage tank B for temporary storage, and are subsequently sent out at an approximately constant rate by discharge means at the lower end of the storage tank B onto the bucket conveyor F, which further carries them forward into the aligning machine E. After being aligned in the upright position by the machine E, the bottles 26 with the useless head 35 are led to the finishing machine G which cuts off the useless head 35 to obtain synthetic resin bottles 26 with an open mouth 26a as illustrated in FIG. 10. The bottles 26 are then carried by the conveyor M into the bottling machine I and filled thereby and thereafter the mouths are sealed by the capping and sealing machine J.

After application of a label to the side of the bottles by the labelling device K, the filled bottles are sent in the form of a finished product onto the bottle collecting table L. Although the finishing machine G in this arrangement is disposed between the aligning machine E and the bottling machine I, the finishing machine G may be positioned anywhere in the path of transport of upright bottles 26 which extends up to the bottling machine I. For instance, the bottles may be sent out from the moulding machine A in the upright position, with the finishing machine G located directly subsequent to the moulding machine. In place of the labelling K, a printing press may be positioned in the path of transport of the bottles to print the bottles 26.

In the arrangement for the preparation of bottled products described, the apparatuses subsequent to the bottling machine I inclusive, have previously been employed for the process of manufacturing bottled products. Thus the present invention provides a bottle treating process starting with the moulding of the bottles 26 each with useless head 35 and terminating with the bottling on the bottling machine I. The apparatuses other than the finishing machine G, namely, the moulding machine A, storage tank B and aligning machine E are already known, and accordingly a detailed description will hereinafter only be given to an embodiment of the finishing machine G in accordance with the invention.

The structure of the finishing machine G is shown in FIGS. 2 to 8.

Figure 2:
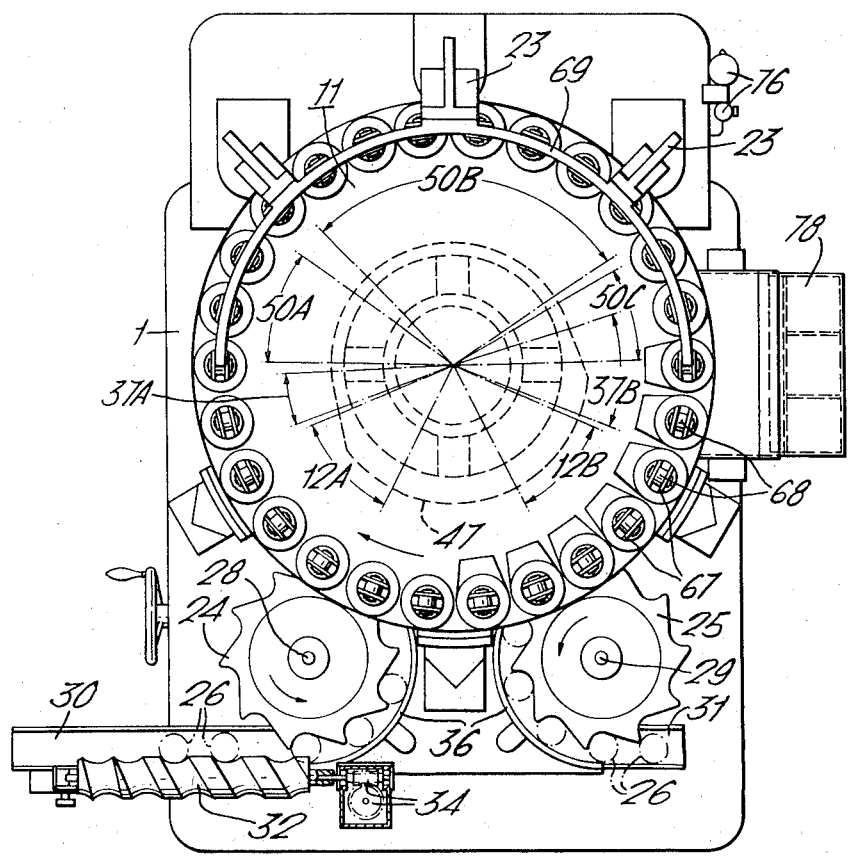
FIG. 2 is a plan view of the bottle finishing apparatus with an upper cover removed.
Figure 3:
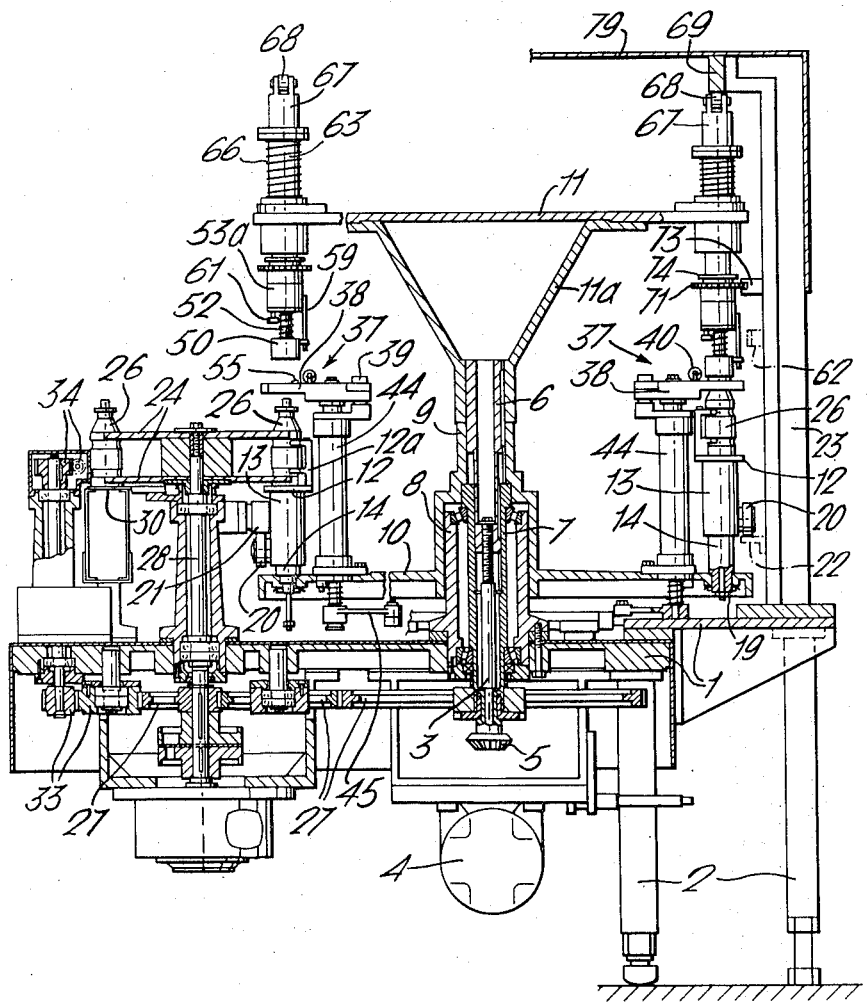
FIG. 3 is a partial vertical section through the apparatus FIG. 2.
Figure 6:
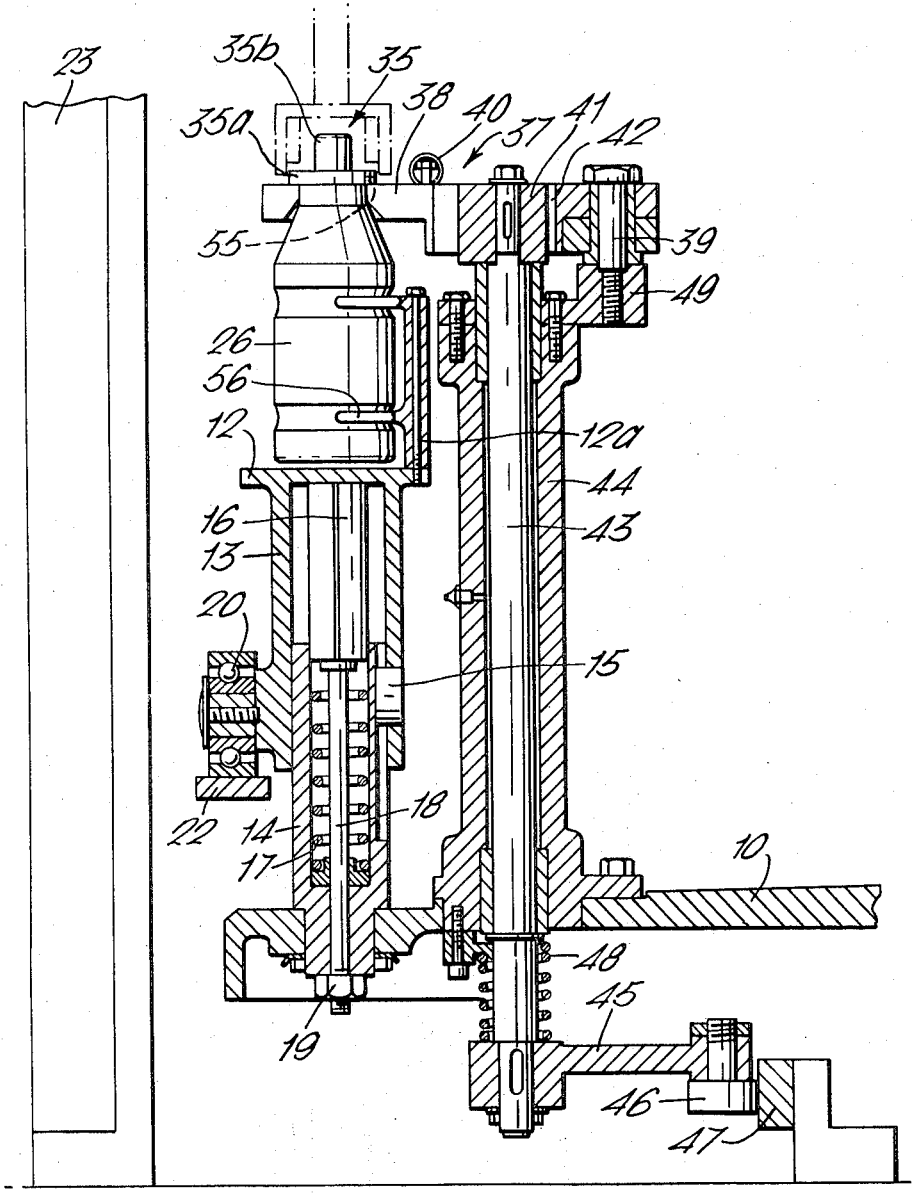
FIG. 6 is a vertical section showing a bottle receiver, a gripping member and a drive mechanism therefor.

A stationary frame 1 is shown in FIGS. 2 and 3 having legs 2, a rotatable drive shaft 3 disposed at the center of the frame 1 and to be driven by a motor 4 through transmission means 5, upper and lower tubular shafts 6 and 7 fitted with the drive shaft 3 and to be rotated integrally therewith, a stationary support cylinder 8, a rotary cylinder 9 having an upper portion fitting around the tubular shaft 6 and a lower portion loosely fitting with the outer periphery of the support cylinder 8. A disc-like turntable 10 is integrally formed with the lower end of the rotary cylinder and an upper rotary disc 11 placed on and secured to a funnel-shaped flaring portion 11a at the upper part of the rotary cylinder 9 has the same diameter as the turntable 10. A plurality of circular bottle receiving means 12 are provided disposed around the turntable 10 and spaced apart by an equal distance along the same circumference. As shown in FIG. 6, the bottle receiving means 12 has a slidable cylinder 13 extending from the under face of the receiving means 12 and slidably mounted, with a key 15, on a guide cylinder 14 fixed to the turntable 10. The bottle receiving means 12 is further formed at the center of its under face with a projecting member 16 which is disposed loosely within the guide cylinder 14 for upward and downward movement, the projecting member 16 being normally retained at an elevated position by a spring 17. A lift rod 18 extends from the lower end of the projecting member 16 through the lower end of the guide cylinder 14. The rod 18 is securedly provided, at its distal end, with a stopper 19 for limiting the amount of the upward movement of the bottle receiver 12. A cam-driven roller 20 is mounted on the outer side of the slidable cylinder 13. Cams 21 and 22 for contact with the upper and lower side faces of the roller 20 serve to lower the bottle receiver 12 and elevate the same to a predetermined position respectively and are mounted on upright posts 23 on the frame 1. A bottle holder 56 extending from the bottle receiver 12 is U-shaped as seen from above.

Star wheels 24 and 25 are provided for feeding and discharging the bottles 26 have part of their peripheries positioned above the turntable 10 and are driven in synchronism with the turntable 10 by the drive shaft 3 through the gear transmission means 27. The center shafts of the star wheels 24 and 25 are indicated at 28 and 29, and conveyor paths for feeding and discharging a single row of bottles 26 are indicated at 30 and 31. A screw 32 for controlling the pitch of the bottles 26 to be sent in is driven in synchronism with and at the same rate with the star wheels 24 by gear transmission means 33 and 34. Arcuate guide plates 36 are disposed outside the star wheels 24 and 25.

In the apparatus described above, the bottles 26 with useless heads 35 which have been blow-moulded by the moulding machine, are transferred from the feeding conveyor path 30 onto the bottle receivers 12 by means of the star wheels 24. At this time, the bottle receiver 12 is retained in a lowered position against the action of the spring 17 as seen in the left-hand portion of FIG. 3, due to the contact of the driven roller 20 with the cam 21. When the bottle 26 placed on the receiver 12 leaves the star wheels 24, the bottle receiver 12 is urged upward by the spring 17 and retained in turn in an elevated position by the cam 22 in contact with the under face of the driven roller 20. The bottle receiver 12 thus positioned is then revolved along with the turntable 10 and in the course of this movement, the useless head 35 is cut off the bottle 26 for finishing. The finished bottle 26 is then removed from the bottle receiver 12 now retracted to the lower position by the cam 21 and is sent out onto the discharging path 31 by the star wheels 25.

The construction and operation of the mechanism for removing the useless head 35 from the bottle 26 during the revolving movement will be described.

Figure 7:
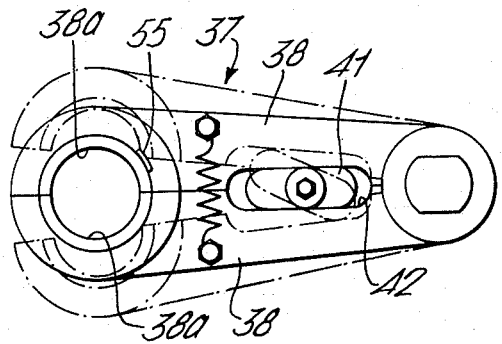
FIG. 7 is a plan view of the gripping member.

With reference to FIGS. 3, 6 and 7, a bottle gripping member 37, disposed above each of the bottle receivers 12, has a pair of grasping pieces 38 and 38 adapted for opening and closing and formed at their distal ends with opposing semi-circular recesses 38a. When the bottle receiver 12 reaches the elevated position, the neck of the bottle 26 thereon is loosely and rotatably grasped by the gripping member. A cutting blade 55 is secured to one of the grasping pieces 38 and is adapted to be positioned under the lower face of a flange 35a at the lower end of the useless head 35 grasped by the pieces 38. A pivot 39 supports both grasping pieces 38 and 38. A closing spring 40 extends between the grasping pieces. An opening and closing cam 41 of an elongated elliptical shape is positioned in an elongated elliptical aperture 42 defined by the grasping pieces 38 and 38 therebetween. A rotatable shaft 43 for driving the cam 41 extends through a support tube 44 secured to the turntable 10 and projects downward from the table. A pivotal arm 45 is secured to the lower end of the rotatable shaft 43 and has at its distal end a cam-driven roller 46 in which comes into and out of contact with an annular cam 47 (see FIGS. 2 and 6) for causing the grasping pieces 38 and 38 to open and close. The annular cam 47 is fixed to the frame 1. A coil spring 48 is provided around the lower extension of the rotatable shaft 43. A mounting member 49 for the pivot 39 is secured to the upper end of the support tube 44.

Figure 4:
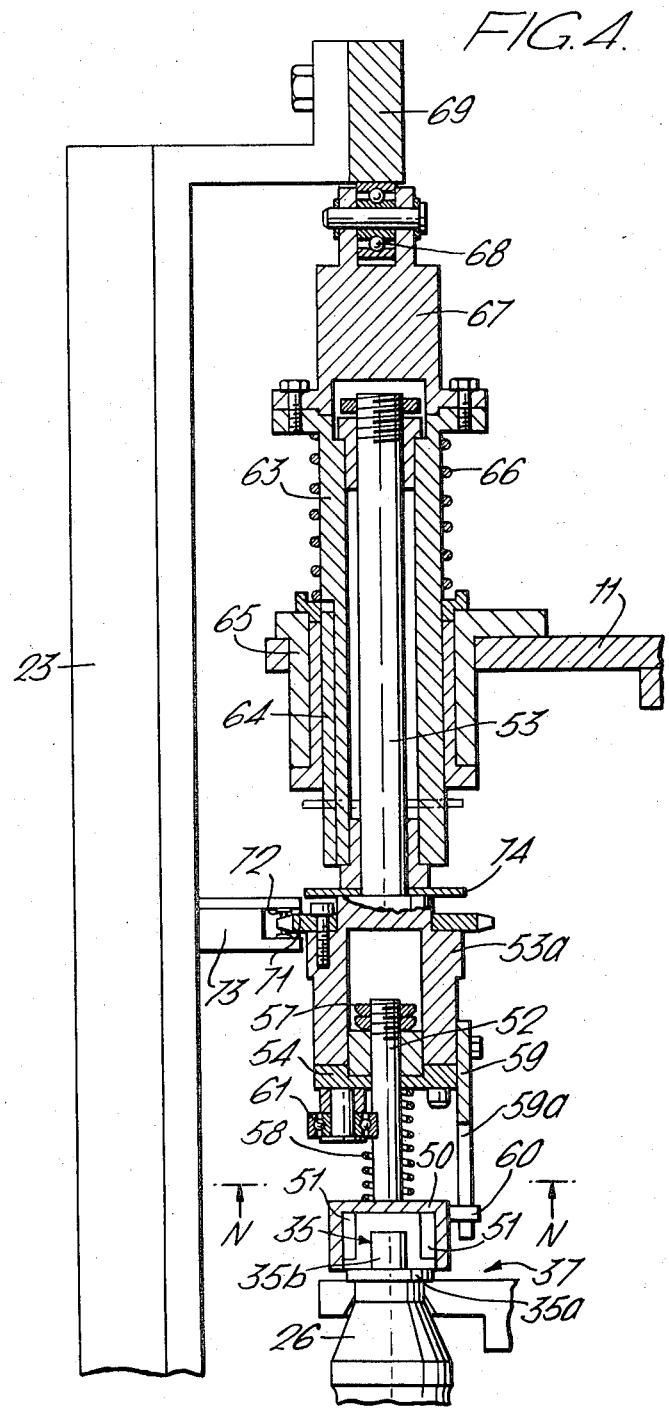
FIG. 4 is a vertical section showing a bottle rotating member and a drive mechanism therefor.
Figure 5:
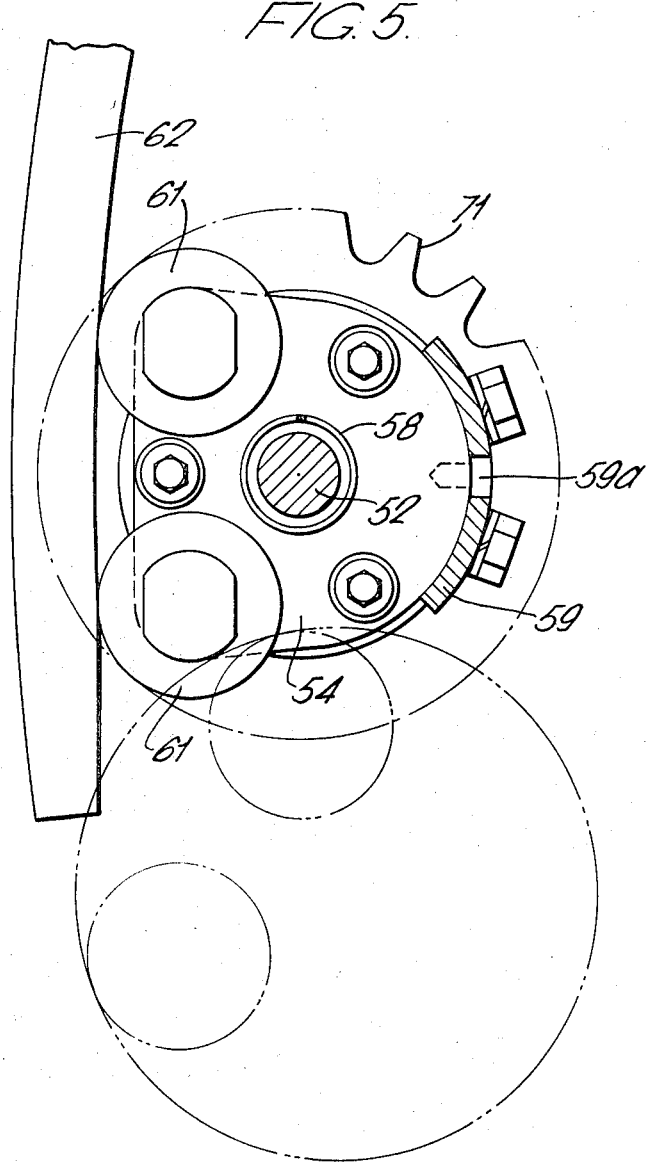
FIG. 5 is a sectional view along the line N — N of FIG. 4.

Referring to FIGS. 3 and 4, an inverted U-shaped bottle rotating member 50, provided above the bottle gripping member 37, has in its interior a pair of opposing pins 51 and 51 for fitting engagement with the useless head 35 of the bottle 26 held by the gripping member 37. A liftable guide rod 52 extends upward from the bottle rotating member 50 coaxially therewith, with its upper portion passing through a cover 54 and disposed loosely within a cylindrical portion 53a provided at the lower end of a rotary shaft 53. A stopper 57 is screwed on the upper end of the rod. Disposed on the lower portion of the rod is a coil spring 58 which resiliently urges the bottle rotating member 50 downward all the time. An arm 59 for delivering the rotation of the rotary shaft 53 to the bottle rotating member 50 has an upper end secured to the outer peripheral face of the cylindrical portion 53a and a lower portion formed with a longitudinal cutout 59a receiving in vertically slidable manner a pin 60 on the outer periphery of the bottle rotating member 50. Two position-correcting guide rollers 61 are mounted on the under face of the cover 54 is sidewise projecting manner and adapted for contact with a guide rail 62 secured to the post 23 at the desired position, whereby the bottle rotating member 50 is angularly adjusted to a predetermined position prior to and after rotation. A cylindrical slider 63 rotatably housing the rotary shaft 53 is mounted at a peripheral portion of the upper rotary disc 11 in vertically movable manner by means of a key 64 and a bush 65, the slider 63 being urged upward by a coil spring 66 all the time. A bracket 67 mounted on the upper end of the slider 63 carries a cam-driven roller 68 adapted for contact with the under face of a semicircular depressing cam 69 on the upper end of the post 23 during the circular movement. A sprocket 71 for driving the rotary shaft 53 is secured to the stepped portion at the upper end of the cylindrical portion 53a. A chain 72 of a required length meshes with the sprocket and is positioned flush with the sprocket 71 as it is driven in the lowered position. A bracket for supporting the chain is indicated at 73 and a stopper for determining the upper extreme position of the slider 63 at 74.

Referring to FIG. 8, an air nozzle 75 for removing the useless head 35 cut off the bottle 26 is located at a position on the line of movement of the gripping member 37 and directed outward. An air pump for regularly supplying compressed air to the nozzle and control means are indicated at 76. Indicated at 77 is an air pipe connected to the nozzle 75; at 78, a chute for discharging the useless head 35; and at 79, an upper cover for the apparatus.

When the bottle 26 is to be released from the star wheels 24 onto the bottle receiver 12, the gripping member 37 keeps its grasping pieces 38 and 38 open under the action of the cam 37. More specifically, the projection of the cam 47 pivotally moves the pivotal arm 45 a predetermined angle to drive the rotatable shaft 43 and cam 41, whereupon the grasping pieces 38 and 38 are retained in the open position as indicated in a broken line in FIG. 7. The upward movement of the bottle receiver 12 then brings the useless head 35 of the bottle 26 to a position between the grasping pieces 38 and 38 of the gripping member 37. Subsequently, the driven roller 46 moves past the projection of the cam 47, permitting the gripping member 37 to close under the action of the closing spring 40 and loosely grasp the neck of the bottle 26, namely a portion of the bottle under the useless head 35. At this time, the cutting blade 55 is brought to the predetermined position for cutting off under the flange 35a of the bottle 26.

The bottle rotating member 50 is then lowered by the cam-driven roller 68 being brought into contact with the semicircular depressing cam 69 disposed thereabove. Thus, the driven roller 68 depressed by the cam 69 causes the slider 63 and the rotary shaft 53 to move down against the spring 66, bringing the bottle rotating member 50 at its lower end into fitting engagement with the useless head 35 of the bottle 26. The bottle 26 is thereafter depressed slightly under the compression of the spring 58, which forces the cutting blade 55 to pierce the under face of flange 35a of the bottle 26. In this state, the engaging pins 51 and 51 within the bottle rotating member 50 are positioned at the opposite sides of a laterally elongated, bulged portion 35b at the upper part of the useless head 35 and having an inverted U-shaped section as shown in FIG. 4. Even if the engaging pins 51 abut the top of the bulged portion 35b in the course of the above-mentioned fitting engagement, the inverted U-shaped, curved top face of the bulged portion 35b as well as the rotatability of the bottle 26 will permit the bottle 26 to rotate, always assuring that the engaging pins 51 will be positioned at the opposite sides of the bulged portion 35a.

Subsequently, the bottle rotating member 50 is driven. More specifically, the sprocket 71 comes into mesh with one end of the chain 72 and is thereby driven on its own axis due to the rotation of the rotary disc 11. The rotation thus effected is therefore delivered to the rotating member 50 by way of the rotary shaft 53, arm 59 and pin 60, with the result that the engaging pins 51 and 51 rotate the bulged portion 35b of the bottle 26 in pushing contact therewith. This causes the cutting blade 55 wedging into the under face of the flange 35a to move circularly in relative relation to the rotating bottle to thereby cut the useless head 35 off the main body of the bottle 26. After making approximately three turns of rotation, the bottle 26 comes to a halt upon the sprocket 71 being disengaged from the rear end of the chain 71. Due to the contact of the guide rollers 61 with the guide rail 62 subsequent to the stopping of rotation, the bottle rotating member 50 is corrected to the original position. Upon the useless head 35 being completely cut off, the driven roller 68 reaches the rear end of the depressing cam 69, which forces the spring 66 to return the bottle rotating member 50 upward to the original position.

In this state, the cut-off useless head 35 is positioned on the mouth of the bottle 26 and on the gripping member 37. When the head reaches the removing position, namely a position in front of the air nozzle 75, the head is blown off the place by the compressed air and drops into the discharge chute 78. After melting, the useless heads will be regenerated into bottles by the molding machine. On the other hand, the bottle 26 now free of the useless head 35 and open at its upper end 26a as shown in FIG. 10 is released from the gripping member 37, with the grasping pieces 38 and 38 opened by the action of the cam 47. The subsequent downward movement of the bottle receiver 12 brings the bottle back to the plane of the star wheels 25, which transfers the bottle from the receiver 12 onto the discharging conveyor path 31. The bottle is then forwarded to the bottling machine I for the filling operation to follow.

Further FIG. 2 shows the positions where the upward and downward movement of the bottle receiver 12, opening and closing of the gripping member 37 and up and down movement and rotation of the bottle rotating member 50 take place. In the drawing a section for the upward movement of the bottle receiver 12 is indicated at 12A; section for the downward movement of the same, at 12B; section for the closing action of the gripping member 37, at 37A; section for the opening movement of the same, at 37B; section for the downward movement of the bottle rotating member 50, at 50A; section for the rotation the same, at 50B; and section for the upward returning movement of the same, at 50C.

Although the foregoing embodiment is so designed as to cause the bottle rotating member 50 to rotate the bottle 26 about three turns to assure complete cutting-off of the useless head 35, the apparatus may be such that the bottle 26 will be given at least one turn of rotation. Further if the gripping member 37 is so adapted as to receive the neck of the bottle 26 from the distal end thereof in its open position, the bottle receiver 12 need not be adapted for upward and downward movement unlike the embodiment described.

It will be apparent from the description above that in accordance with this invention, the bottles formed by a moulding machine each with a useless head are led to a finishing machine for the removal of the useless head in the course of feeding to a bottling machine, so that it is possible to fill the bottles despite the fact that the present process starts with the moulding of bottles which it is impossible to fill in because of the provision of the useless heads. Thus the invention ensures a continuous, smooth and efficient bottling operation. Further, since the bottles are temporarily stored in a storage tank after moulding but before they are fed to the bottling machine, bottled products can be produced in continuous operation even when the moulding machine is laid-off for inspection or adjustment.

A hygienic and efficient process is provided for manufacturing bottled products to be practised continuously from the moulding of bottles with a useless head up to the bottling operation.

What we claim is:

1. In a bottle finishing apparatus for removing useless heads from moulded bottles where bottles (26) with useless heads are continuously conveyed in line by transportation means (32) into the apparatus, engaged at the entrance of the apparatus by transfer means (24), placed into turntable holding means (12), acted on by a bottle gripping member (37) and bottle rotating means (50) disposed over said turntable holding means (12) so that the useless head (35) is cut off by a cutting blade (55), the finished bottle then being removed from the bottle holding means (12) by second transfer means (25) to be then transported to the nest work station, in combination:

a. transportation means comprising screw conveyor means (32) the screw pitch being sized to grip at least a portion of a bottle (26) and move the bottle (26) along a conveyor path (30) into the apparatus;

b. transfer means comprising a star wheel (24) defining the entrance to said apparatus, disposed to engage a bottle (26) located in said conveyor path;

c. turntable holding means (12) comprising a turntable (10) with a plurality of bottle receiving means (12) disposed around said turntable, said star wheel (24) driving said bottles (26) into said bottle receiving means, said bottle receiving means having a guide cylinder (14) and including a projecting member (16) disposed loosely within said guide cylinder for upward and downward movement normally biased in an elevated position, cam means (21, 22) disposed to lower and elevate said bottle receiving means (12), U-shaped bottle holding means (56) extending from said bottle receiving means (12) disposed to partly encircle said bottle, the bottle receiving means being retained in a lower position when first receiving said bottle from said star wheel (24) by the action of said cam means (21), said bottle receivving means being urged upwards and retained in an elevated position by said cam means (22) after leaving said star wheel (24), to be acted on by said gripping member (37) and said bottle rotating member (50);

d. a two armed tong-shaped gripping member (37) disposed above said bottle receiving means, an upstanding cutting blade mounted on at least one of said arms, cam means (41) serving to separate said arms so as to trip said bottle, said cam means (41) being coupled to a rotatable shaft (43) with a pivotal arm (45) and a cam (47), said pivotal arm (45) engaging said cam (47), thereby turning said cam means (41) to open said arms; and, e. bottle rotating means (50) disposed above said gripping member (37), a pair of opposed pins (51) within said rotating means (50) to engage said useless head held by said gripping member (37), a liftable guide rod (52) extending upwards from said rotating member (59), spring means (58) on said guide rod (52) for urging the bottle (26) downwards forcing said cutting blade to pierce under a flange (35a) of the bottle (26), a rotating shaft (53) disposed over said guide rod (52), an arm (59) for delivering the rotation of said rotary shaft (53) to said rotary member (50), and means to rotate said rotary shaft.

* * * * *